(12) United States Patent
Debo

(10) Patent No.: US 6,474,668 B2
(45) Date of Patent: *Nov. 5, 2002

(54) PULL OUT TAILGATE STEP

(76) Inventor: Gregory F. Debo, 141 Silver Rd., New Brighton, PA (US) 15066

( * ) Notice: Subject to any disclaimer, the term of this patent is extended or adjusted under 35 U.S.C. 154(b) by 0 days.

This patent is subject to a terminal disclaimer.

(21) Appl. No.: 09/865,176

(22) Filed: May 24, 2001

(65) Prior Publication Data
US 2001/0035625 A1 Nov. 1, 2001

Related U.S. Application Data

(63) Continuation-in-part of application No. 09/329,383, filed on Jun. 10, 1999, now Pat. No. 6,237,927.

(51) Int. Cl.⁷ .................................................. B60R 3/00
(52) U.S. Cl. ...................................................... 280/166
(58) Field of Search ............................ 280/163, 164.1, 280/166, 169; D12/203; 182/88, 90, 100; 105/449; 293/127, 142; 267/140; 296/62

(56) References Cited

U.S. PATENT DOCUMENTS

| | | | |
|---|---|---|---|
| 137,547 A | 4/1873 | Gould | |
| 349,986 A | 9/1886 | Dickey | |
| 1,601,708 A | 7/1926 | Thomas | |
| 1,939,604 A | 12/1933 | Bronson | |
| 3,695,666 A | 10/1972 | Corson | |
| 4,108,458 A | 8/1978 | Owens | |
| 4,182,520 A | 1/1980 | Stevenson | |
| 5,205,603 A | * 4/1993 | Burdette | 296/62 |
| 5,513,866 A | * 5/1996 | Sisson | 280/166 |
| D370,452 S | 6/1996 | Beasley | |
| 5,716,064 A | 2/1998 | Frerichs | |
| 5,738,362 A | 4/1998 | Ludwick | |
| 5,803,475 A | 9/1998 | Dick | |
| 5,803,523 A | * 9/1998 | Clark et al. | 296/26.1 |
| 5,897,125 A | 4/1999 | Bundy | |
| 6,042,923 A | * 3/2000 | Lewis | 428/68 |
| 6,237,927 B1 | 5/2001 | Debo | |

* cited by examiner

Primary Examiner—Brian L. Johnson
Assistant Examiner—Gerald Klebe
(74) Attorney, Agent, or Firm—Gaca, Matis, Baum & Rizza

(57) ABSTRACT

A pull out step which can be extended directly to the rear of a pickup truck makes it possible to step from the ground to the tread of the step and then to the tailgate of the truck. A bracket attached to a trailer hitch on the truck slidably supports a beam which supports the tread and allows the beam to be locked in either the extended or retracted positions. For use with trucks having an unusually high chassis, the beam may include a gooseneck to lower the elevation of the tread to approximately one half the elevation of the tailgate. The bracket may also be attached directly to the body of the truck.

7 Claims, 7 Drawing Sheets

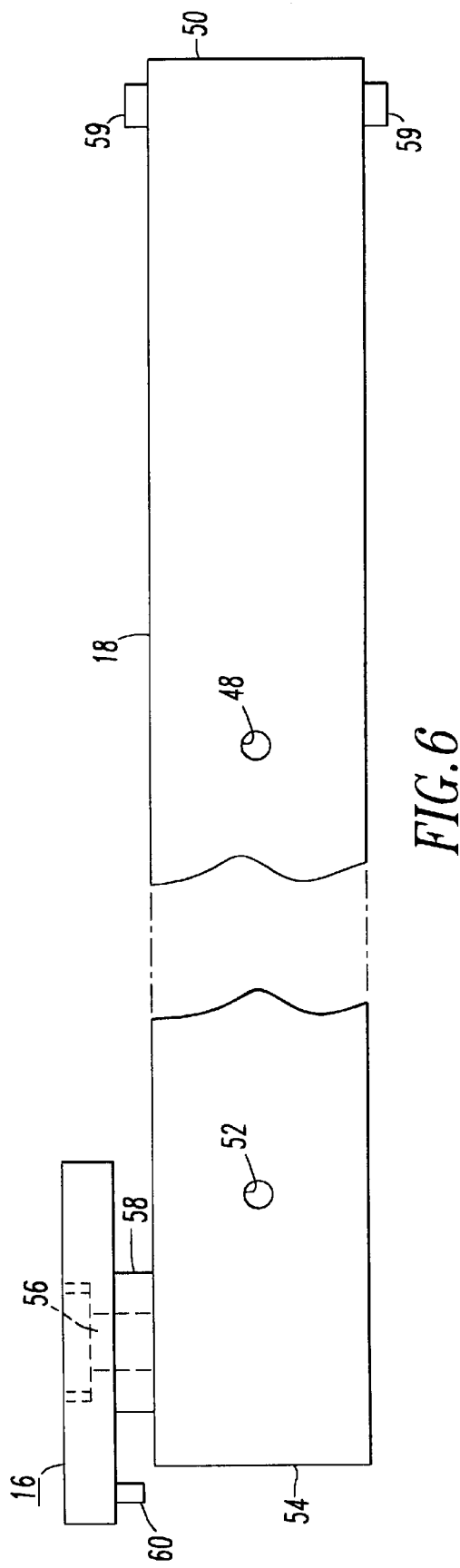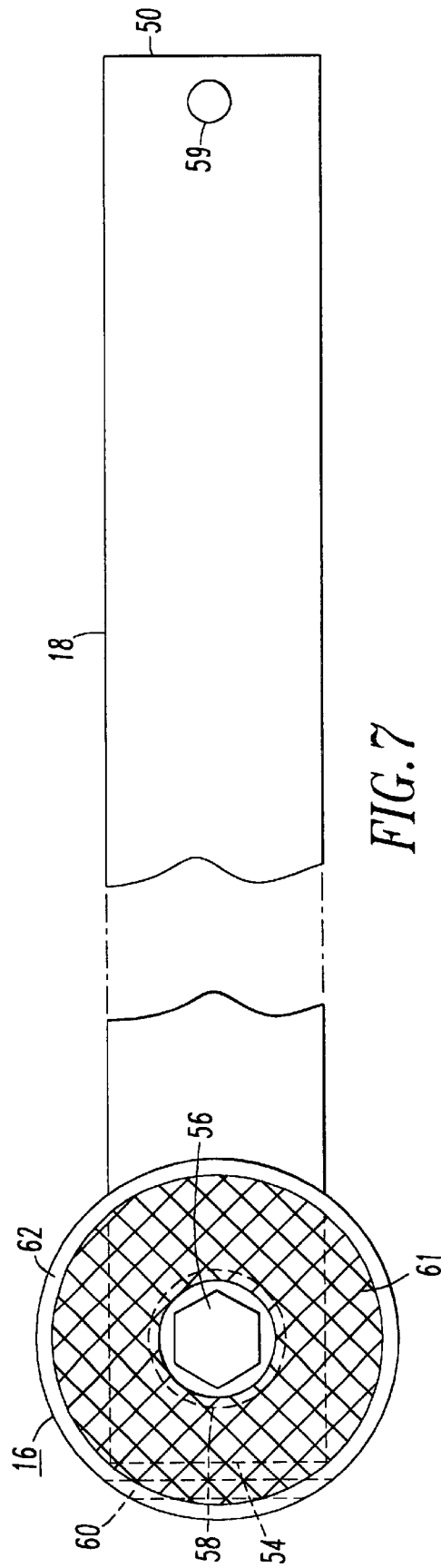

PULL OUT TAILGATE STEP

This application is a continuation-in-part of application Ser. No. 09/329,383, filed Jun. 10, 1999 now U.S. Pat. No. 6,237,927.

BACKGROUND OF THE INVENTION

This invention relates to devices for assisting in mounting and dismounting from a motor vehicle and, more particularly, to a pull out step to provide access to the tailgate of a truck.

Pull out steps which provide access to the side of a truck have been used in the past. Such steps are described in U.S. Pat. No. 4,108,458 and U.S. Pat. No. 5,716,064. Such steps do not provide access to a truck's tailgate. The device described in U.S. Pat. No. 5,716,064 is intended to give a user the ability to enter the bed of a pickup truck by means of a pull out step mounted on the front spring hanger of the truck's rear axle and thus located near the front of the pickup truck bed. Such a device has the disadvantage of requiring the user, while standing on the pull out step with one foot, to lift his other foot over the side of the pickup truck bed. Such a maneuver is awkward and may be dangerous, particularly if the user is carrying an object in his hands.

SUMMARY OF THE INVENTION

The present invention provides a detachable pull out step adapted for attachment to a trailer hitch located under the bed of a pickup truck. The step tread is attached to a beam which slidably or telescopically engages a bracket which is attached to the trailer hitch. When the beam is extended to the rear of the truck, the tread extends past the rear of the tailgate when the tailgate is in the horizontal position, thus permitting a person to step from the ground to the tread and then to the tailgate in the manner in which one normally climbs stairs. Locking means is provided to secure the beam in both the extended and retracted positions. The tread is provided with a slip resistant upper surface and with a rubber bumper around the edge. A gooseneck may be provided between the beam and the tread so that the elevation of the tread above the ground will be substantially half the elevation of the tailgate when it is in the horizontal position. The bracket may also be attached to the body of the truck.

BRIEF DESCRIPTION OF THE DRAWINGS

FIG. 6 is a side elevation view of the step tread and supporting beam of the pull out step shown in FIG. 1.

FIG. 7 is a plan view of the tread and beam shown in FIG. 6.

DESCRIPTION OF THE PREFERRED EMBODIMENTS

Figure 1:
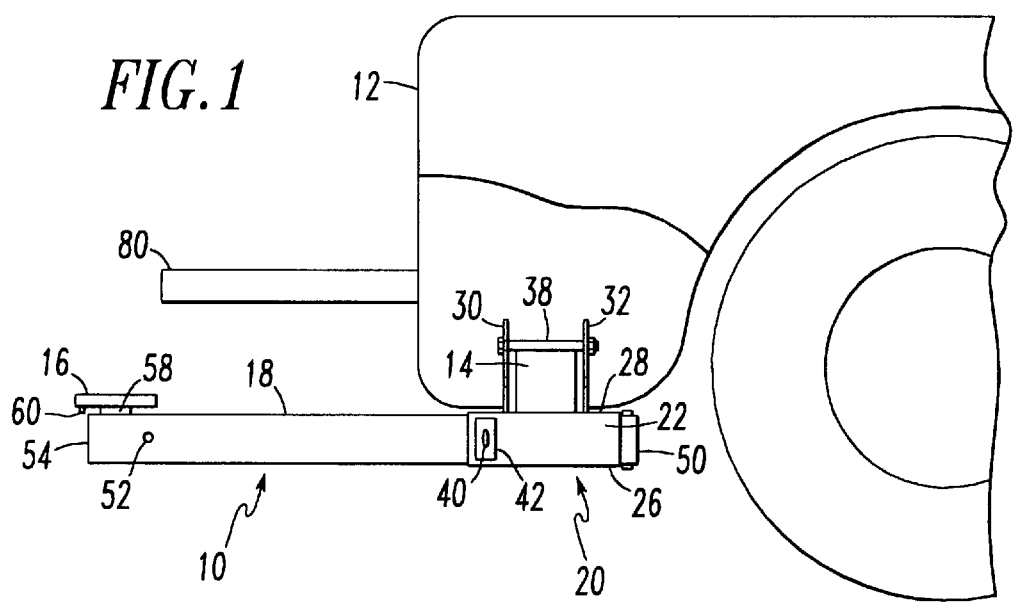
FIG. 1 is a side elevation view of one embodiment of the pull out step attached to a pickup truck.
Figure 2:
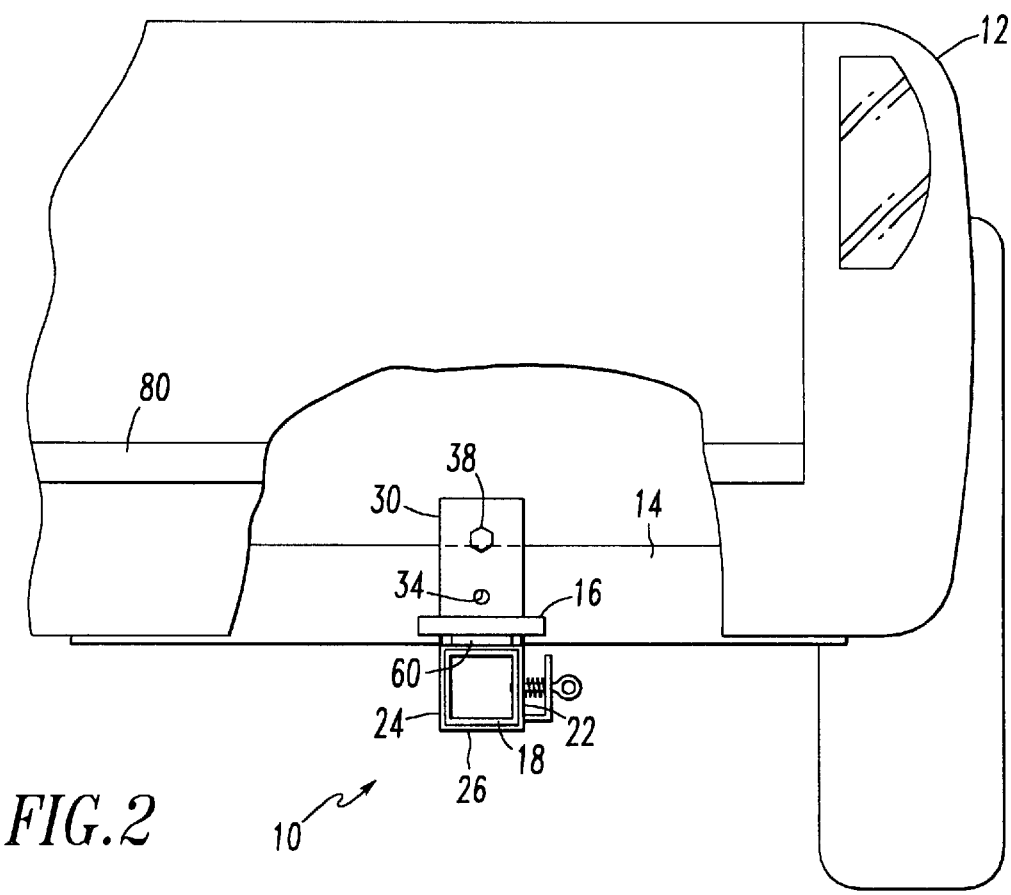
FIG. 2 is a rear elevation view of the pull out step and truck shown in FIG. 1.

Referring to the drawings, FIGS. 1 and 2 show a pull out step 10 attached to a pickup truck 12 which is equipped with a trailer hitch 14. The pull out step includes a tread 16, a beam 18, and a bracket 20. As is shown in more detail in FIGS. 4 and 5, the bracket 20 is comprised of an open ended box which includes a first side wall 22, a second side wall 24, a bottom 26, and a top 28. The bracket 20 also includes a first flange 30 and a second flange 32. The two flanges are spaced apart sufficiently to permit a standard trailer hitch 14 to fit between them in the manner shown in FIG. 1. The flanges 30 and 32 are provided with first bolt holes 34 and 34' respectively. Bolt holes 34 and 34' have a common axis and are spaced above the top 28 sufficiently to aline with the holes that are commonly provided in conventional trailer hitches. The flanges 30 and 32 are also provided with second bolt holes 36 and 36' respectively. As is shown in FIGS. 1 and 2, bolt holes 36 and 36' have a common axis and are spaced above the tope 28 sufficiently to permit a bolt 38 which passes through them to lie directly above the trailer hitch 14. It is contemplated that bolt holes 36 and 36' will be utilized only with trailer hitches which are not provided with holes that will aline with bolt holes 34 and 34'.

The bracket 20 is further provided with a spring loaded pin 40 mounted on the side wall 22 by means of an angle plate 42. The spring 44 urges the pin 40 through a hole 46 in side wall 22 in order to lock the beam 18 in either the extended or retracted position. As is shown in FIG. 6, beam 18 is provided with a first hole 48 near the proximal end 50 of the beam 18 which engages the pin 40 when the beam is in the extended position, as shown in FIG. 1. A second hole 52 near the distal end 54 of the beam 18 engages the pin 40 when the beam is in the retracted position.

Figure 5:
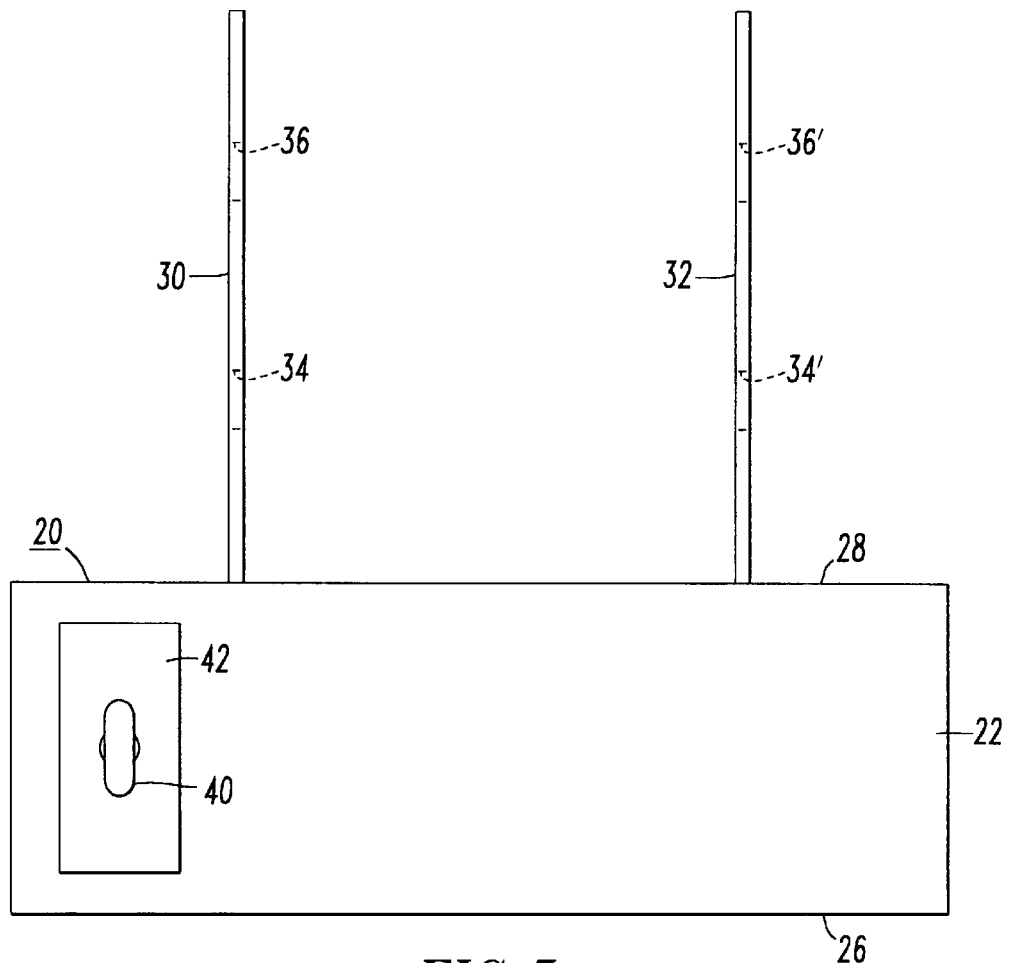
FIG. 5 is a side elevation view of the bracket shown in FIG. 3.

As is shown in FIGS. 6 and 7, the tread 16 is attached to the beam 18 by a bolt 56. A nut 58 is provided to space the tread 16 away from the beam 18 to permit the tread to pass over the top 28 of the bracket 20 when the step is in the retracted position. A handle 60 is affixed to the treat 16 to facilitate pulling the pull out step 10 into the extended position. As is shown in FIGS. 5, 6 and 7, this handle 60 may consist of a rectangular plate welded to the bottom of the tread 16. For safety, a pin 59 is affixed near the proximal end 50 of the beam 18 to prevent the beam from being pulled completed out of the bracket 20.

As is also shown in FIGS. 5, 6 and 7, the tread 16 consists of a circular metal plate which is provided with a diamond pattern 61 on its upper surface to reduce the risk of slipping. A rubber ring 62 is attached to the periphery of the tread 16 to reduce the risk of a user being injured by striking the edge of the tread.

Figure 3:
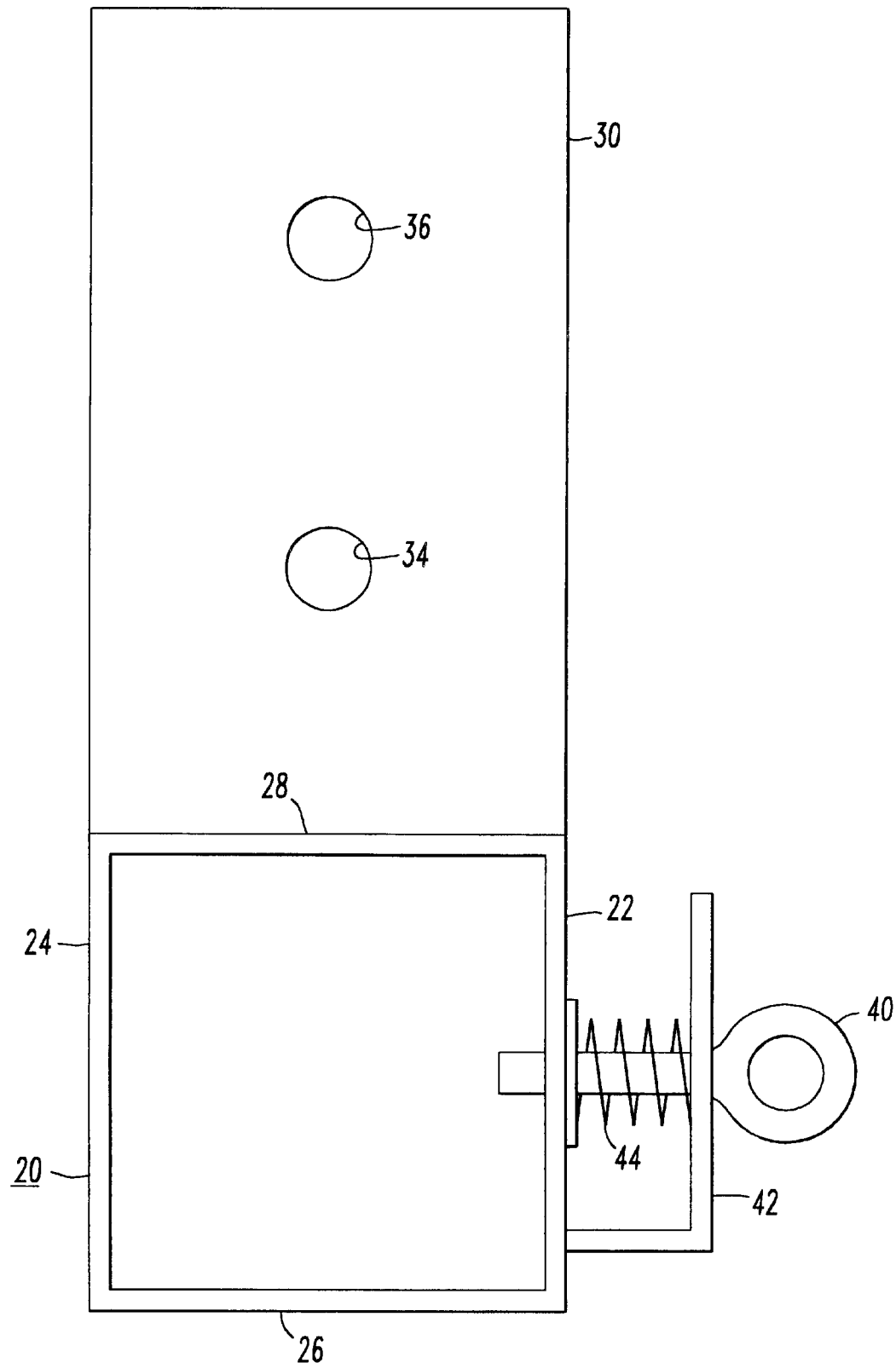
FIG. 3 is a rear elevation view of one embodiment of the bracket used to mount the step on a trailer hitch.
Figure 4:
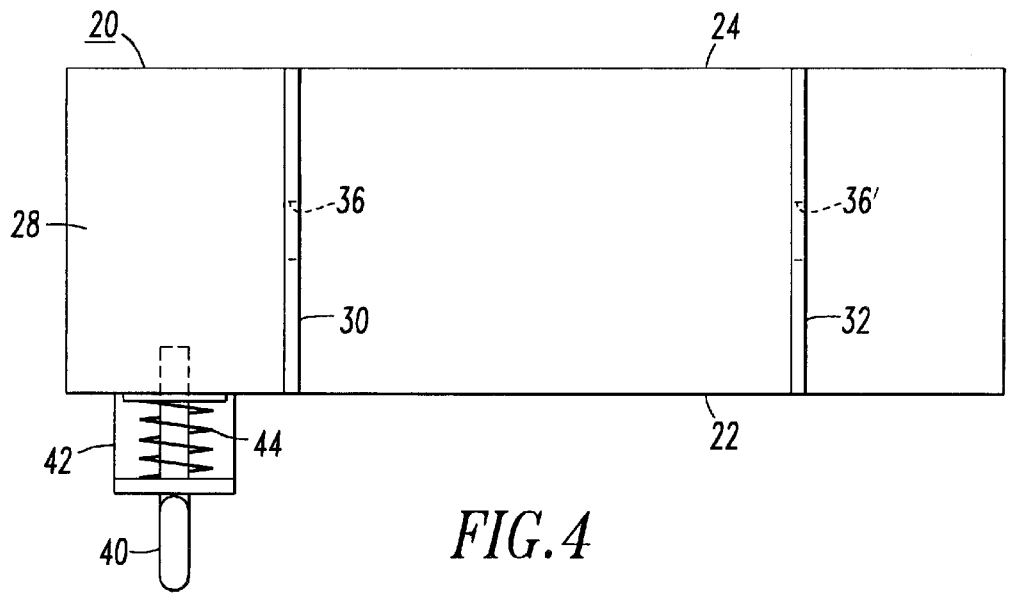
FIG. 4 is a plan view of the bracket shown in FIG. 3.
Figure 8:
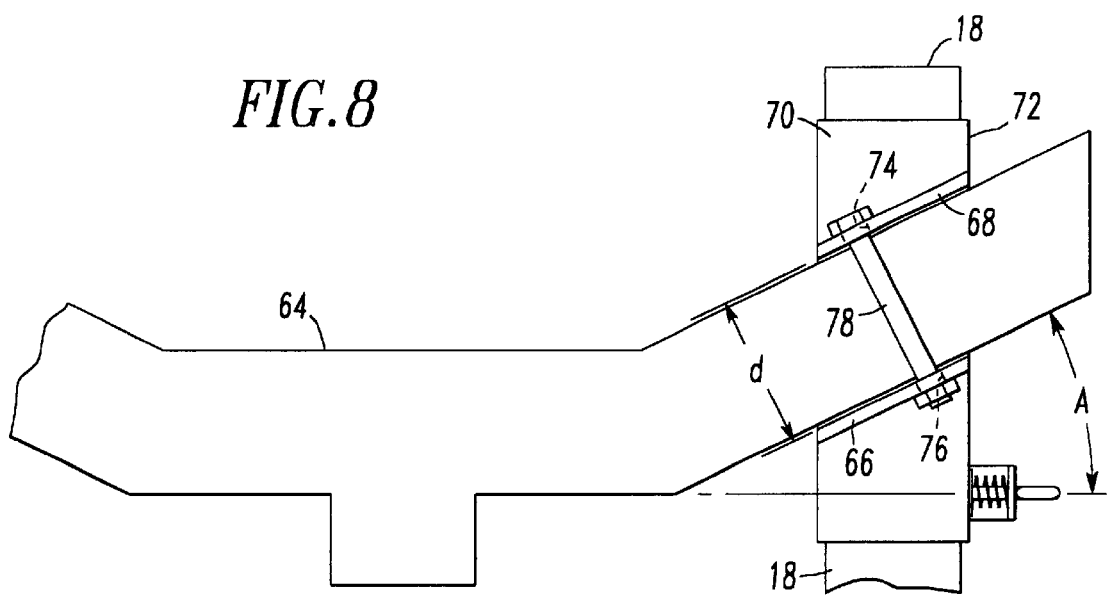
FIG. 8 is a plan view of a second embodiment of the bracket and of a trailer hitch to which it is attached.

It will be understood that, with a pull out step having a bracket 20 as shown in FIGS. 3, 4 and 5, the beam 18 will extend directly to the rear of the truck 12 only if the trailer hitch 14 is perpendicular to the direction of travel of the truck. However, some trailer hitches form an oblique angle to the direction of track of the vehicles to which they are attached. Trailer hitch 64 shown in FIG. 8 is of this type. The embodiment of my invention shown in FIG. 8 is suited for use with such a trailer hitch. In this embodiment, the flanges 66 and 68 are attached to the top 70 of the bracket 72 at oblique angle A so that the beam 18 will extend directly to the rear of the truck to which the trailer hitch 64 is attached. The bolt hole 74 in flange 66 is spaced away from the centerline of flange 66 the distance of ½ tan A where d is the distance between flange 66 and flange 68, and bolt hole 76 in flange 68 is spaced away from the centerline of flange 68 an equal distance on the opposite side of the centerline so that bolt 78 passes through bolt holes 74 and 76 perpendicular to both flanges and crosses the centerline of the bracket 72 half way between the two flanges. The other parts of the bracket 72 are identical to those of bracket 20 as shown in FIGS. 3, 4 and 5 and the beam 18 and tread used with this second embodiment of my invention are as shown in FIGS. 6 and 7.

Figure 9:
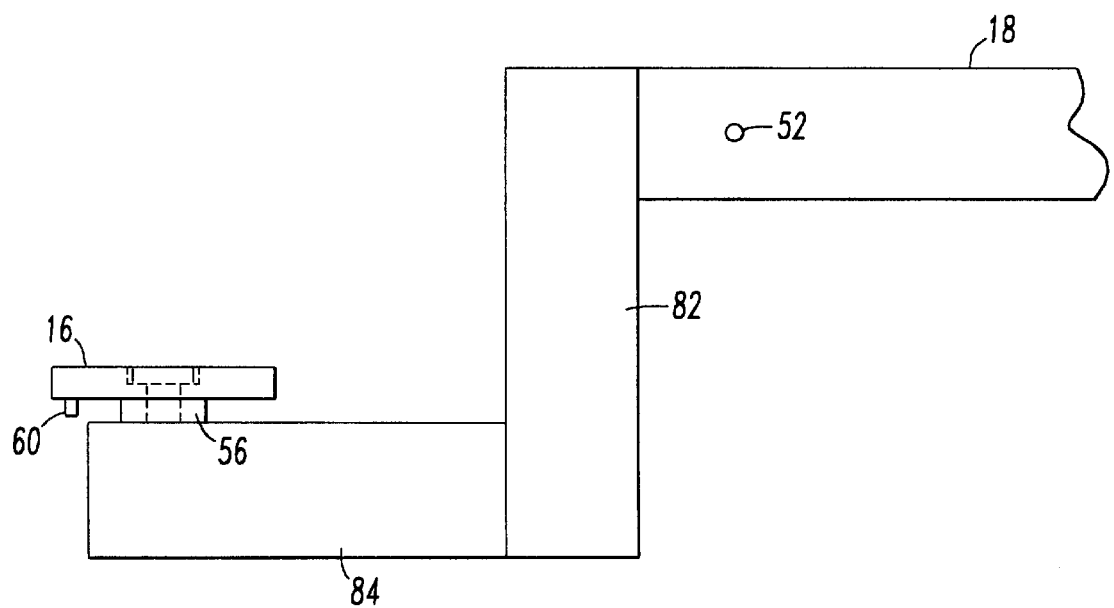
FIG. 9 is a side elevation view of a second embodiment of the step tread and beam.

In operation, the elevation of the tread 16 above the ground should be approximately one half the elevation of the tailgate 80 of the pickup truck 12. With most pickup trucks, this will be accomplished by the embodiment of my invention which are described above. However, this will not be true for a pickup having an unusually high chassis. FIG. 9 shows a modification of the previously described beam 18 and tread 16 for use with such a pickup truck. In this embodiment the beam 18 includes near the distal end 54 a gooseneck comprised of a vertical section 82 and a horizontal section 84. The length of vertical section 82 is sufficient to bring the elevation of tread 16 to approximately one half the elevation of the tailgate (not shown) when the pull out step is mounted as previously described. In this embodiment, the nut 58 shown in the embodiment depicted in FIG. 6 is omitted because it is not necessary to space the tread 16 away from the beam 18. In the embodiment shown in FIG. 9, the tread 16 does not pass over the top 28 of the bracket 20 when the step is in the retracted position.

Figure 10:
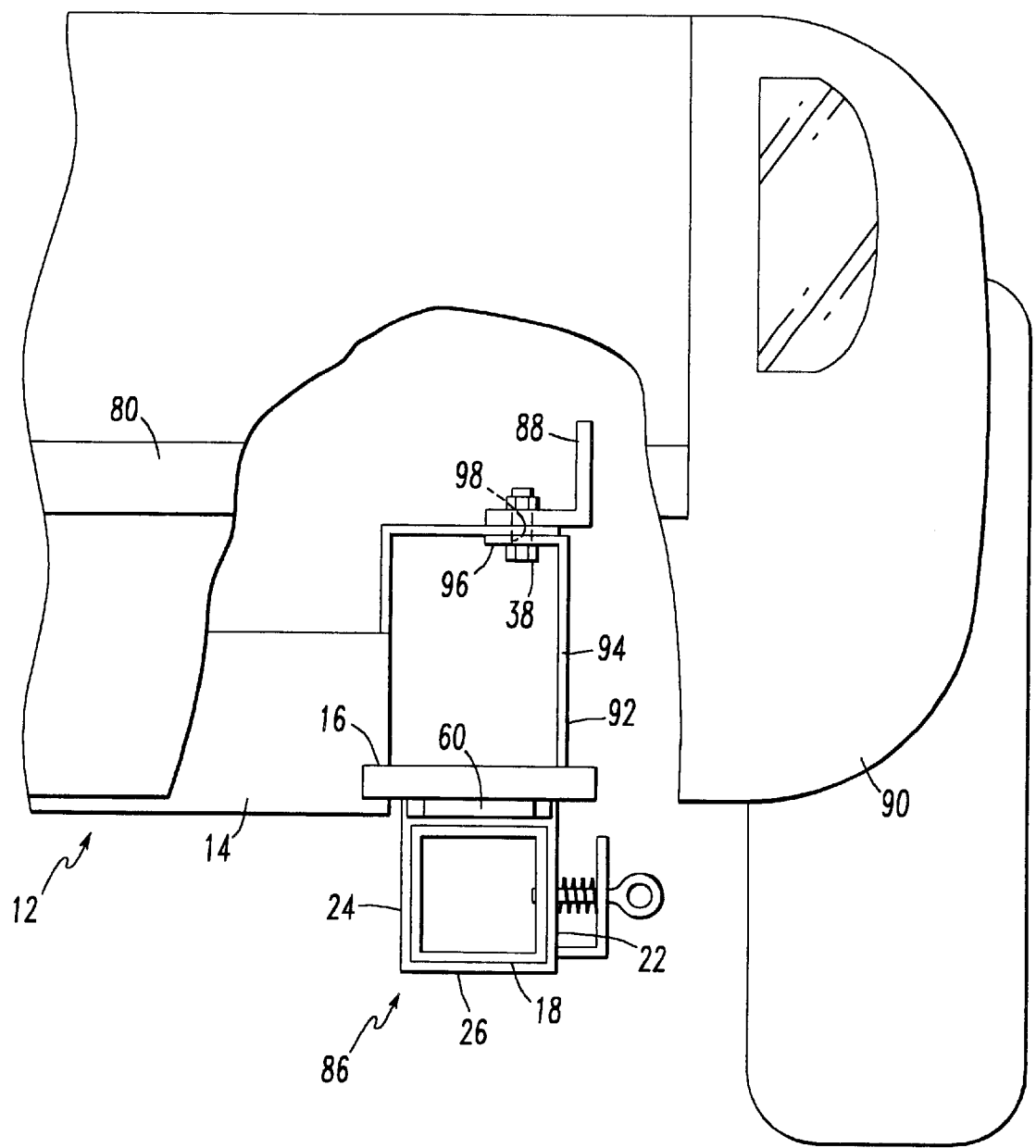
FIG. 10 is a rear elevation view of a third embodiment of the pull out step attached to a pickup truck.
Figure 11:
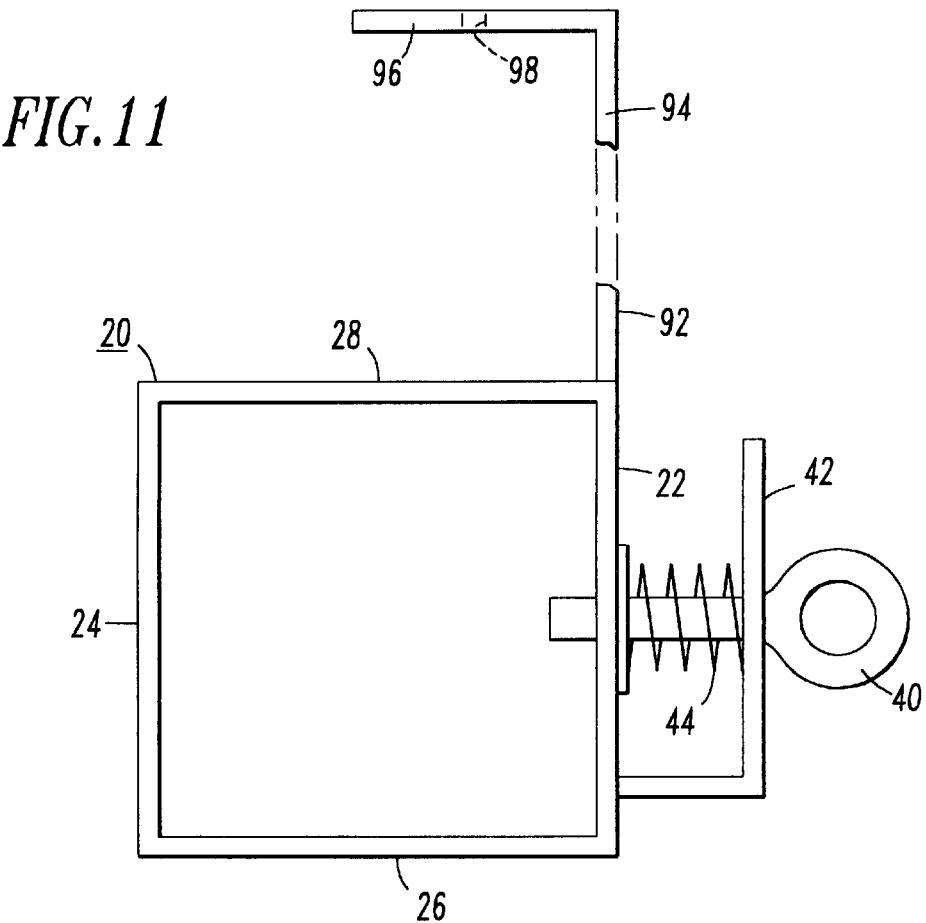
FIG. 11 is a rear elevation view of the bracket and flange shown in FIG. 10.
Figure 12:
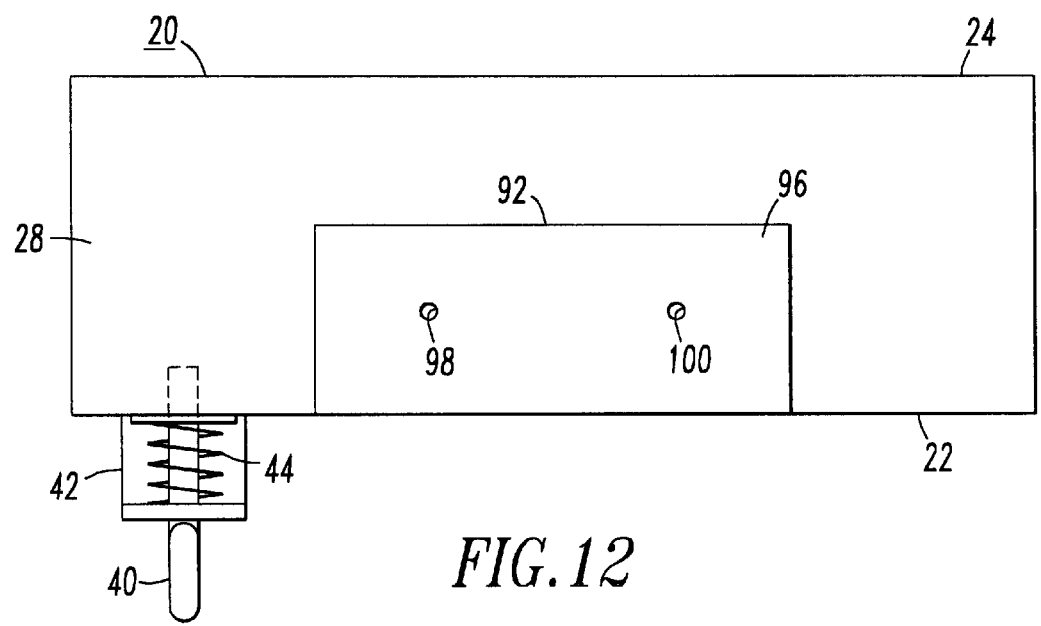
FIG. 12 is a plan view of the bracket and flange shown in FIG. 11.

The pull of step of my invention may also be attached directly to the body of the pickup truck. An embodiment of my invention adapted for such attachment is illustrated in FIGS. 10 through 12. FIG. 10 shows a pull out step 86 attached to a frame member 88 of the body 90 of the pickup truck 12 by a flange 92. Except that the 92 replaces the 30 and 32, the parts of the pull out step 86 are identical to the parts of pull out step 10 shown in FIGS. 1 through 7. A trailer hitch 14 is shown in FIG. 10 only to illustrate the fact that both the pull out step 86 and a trailer hitch can be attached to the same frame member at the same time. It must be understood that, in this embodiment of my invention, a trailer hitch need not be present.

As shown in more detail in FIGS. 11 and 12, the flange 92 include a vertical segment 94 and a horizontal segment 96. The horizontal segment 96 is provided with bolt holes 98 and 100 which are spaced apart to aline with bolt holes (not shown) in the frame member 88. Pickup truck manufactures often provide bolt holes in the frame members near the rear of the truck in order to facilitate the attachment of a trailer hitch. If such holes are not provided they can, of course, be easily drilled. The vertical dimension of the vertical segment 94 of flange 92 should be such that the elevation of the tread 16 is approximately one half of the elevation of the tailgate 80 when the horizontal segment 96 of flanges 92 is bolted to the frame member 88.

In the pull out step shown in FIGS. 1–6, I have found it desirable to utilize for the tread 16 a steel plated 0.48 cm (0.19 inches) thick and 15.24 cm. (6 inches) in diameter with the beam 18 being 91.44 cm (3 feet) in length and comprised of a section of square steel pipe 3.81 cm. (1.5 inches) on a side with walls 0.32 cm. (0.13 inches) in thickness. With respect to the bracket 20, I have found it desirable to construct the walls 22 and 24, the bottom 26 and the top 28 of steel plates 0.64 cm. (0.25 inches) in thickness, 5.08 cm. (2 inches) wide and 20.23 cm. (8 inches) long, with the flanges 30 and 32 comprised of steel plates 0.48 cm. (0.19 inches) thick and 10.16 cm. (4 inches) high. These dimensions can, of course, be varied to accommodate the anticipated use of the device. Many other changes and modifications in the above-described embodiments of the invention can also be carried out without departing from the scope thereof.

I claim:

1. A pull out step device used in combination with a truck having a body and a tailgate, said step device comprising:

a bracket;

a beam having a distal end and a proximal end;

a tread attached to the distal end of said beam;

said beam being telescopically engaged with said bracket;

said bracket being attached to said body of truck such that said beam is parallel to the direction of travel of said truck;

means for selectively locking said beam in an extended position and in a retracted position; and said tread being disposed to the rear of said tailgate when tailgate is in the horizontal position and the beam is in the extended position.

2. A pull out step device used in combination with a truck having a tailgate and a body comprising at least one frame member, said step device comprising:

a bracket;

a flange attached to said bracket;

a beam having a distal end and a proximal end;

a tread attached to the distal end of said beam;

said beam being telescopically engaged with said bracket;

said flange being attached to said frame member of said body of said truck such that said beam is paralleled to the direction of travel of said truck;

means for selectively locking said beam in an extended position and in a retracted position; and said tread being disposed to the rear of said tailgate when the tailgate is in the horizontal position and the beam is in an extended position.

3. A device according to claim 2 wherein said flange comprises a vertical segment.

4. A device according to claim 3 wherein said vertical segment of said flange has a vertical dimension such that said tread is disposed at an elevation one half of the elevation of the tailgate when the tailgate is in the horizontal position.

5. A device according to claim 4 wherein said locking means comprises:

a first hole in at least one side of said beam near the proximal end thereof;

a second hole in at least one side of said beam near the distal end thereof; and a pin mounted on said bracket, said pin being engagable with said first hole when said beam is in the extended position and said pin being engagable with said second hole when said beam is in the retracted position.

6. A device according to claim 4 wherein said tread comprises a plate having a skid resistant upper surface.

7. A device according to claim 6 wherein said tread further comprises a rubber bumper attached to the periphery of said plate.

* * * * *